3,105,791
METHOD OF PREVENTING THE DEVELOPMENT OF IRON DEFICIENCY ANEMIA IN SUCKLING PIGS
John Alexander Banford, George Neal Hill, and William Mack Dillard, Ashland, Ohio, assignors to Richardson-Merrell Inc., New York, N.Y., a corporation of Delaware
No Drawing. Filed July 20, 1961, Ser. No. 125,377
5 Claims. (Cl. 167—53)

This invention relates to methods of and preparations for the prevention of iron deficiency anemias in suckling pigs and other suckling animals.

Huge losses due to the development of anemia in suckling pigs are experienced annually by hog raisers. The prevalence of piglet anemia in pig breeding establishments managed according to modern methods of swine husbandry is well known and constitutes one of the most important problems of the hog raiser. Recent investigations have established the disease as a simple iron deficiency which is complicated by a number of factors uniquely related to iron metabolism in the pig.

The severity of anemia in suckling pigs and the rapidity with which it develops, in comparison with other mammals, can be explained in view of several aspects of iron metabolism in this species which combine to cause iron deficiency in early postnatal life. Although the iron content of sows' milk is slightly greater than that of cows' milk or ewes' milk, the early rate of growth of the pig is much greater than that of the calf or lamb. Piglets reach 4 to 5 times their birth weight at the end of 3 weeks and 8 times their birth weight after 8 weeks. A growth rate of this magnitude requires the retention of about 7 mg. of iron for each piglet per day if its physiological needs are met. The diet of the piglet up to 3 weeks of age consists largely or entirely of its mother's milk. The milk ordinarily consumed by each piglet per day supplies only about 1 mg. of iron. The utilization of iron in the milk diet of the baby pig when fed at the minimum requirement level is only about 30%. This is not increased by iron depletion and anemia which may develop before the piglet is able to obtain iron from other dietary sources.

The piglet is born with unusually low concentrations of total body iron and of low iron stores in the liver. The amount of iron in the pig's liver is, therefore, even more inadequate for the requirements of the body during the suckling period than is the liver iron for the same purpose in the other species.

In marked difference to other mammals, the pig is not born with a plethora of hemoglobin in its blood. In fact, the hemoglobin concentration of the blood of the healthy pig is very similar at birth, at weaning, and at maturity. The absence of this source of endogenous iron, shown to be so important to the human infant, combined with a very rapid rate of growth, are considered to be highly significant factors in the etiology of anemia of the suckling pig.

The combined factors of rapid rate of growth, low iron content of milk, unusually low stores in the body at birth, and the absence of a plethora of hemoglobin in the blood of the pig at birth, adequately explain the etiology of iron deficiency anemia due to iron deficiency in the piglet, compared to the incidence of iron deficiency anemia of the lamb, calf and foal.

Anemia due to iron deficiency of the piglet can be prevented, or they respond to treatment with iron during the first few days of life, only provided the anemia has not been so severe as to produce permanent damage to the body.

Several methods of prevention and treatment of iron deficiency anemia of suckling pigs, by supplying iron to the pig, have been employed with variable results:

Iron salts have been administered orally to the suckling pig in early post-patal life with fairly satisfactory results. This mode of prevention or treatment is time consuming, requires repeated administration of iron, and response to treatment is slow, often requiring several days. Close confinement and restraint of piglets is required for administration of the iron salts.

Iron salts have been combined with syrups and used in swabbing the sow's udder during the early part of the suckling period. This method of prevention or treatment is time consuming, requires repeated application, is unsanitary and may constitute a hazard in the spread of infectious disease, control of dosage is impractical and small, weak and anemic pigs may obtain insufficient amounts of iron, and response to treatment is slow.

Various iron complexes have been administered parenterally to piglets during the first few days of life. This procedure is most frequently performed without knowledge of or appreciation for sanitary and aseptic procedures, and is therefore best performed by the professional rather than by the lay operator. The procedure is expensive, time consuming, requires close confinement and restraint for administration, and requires special equipment.

Soil provided in a box or trough inside the pen has been used in the prevention and treatment of anemia. Such a method of prevention or treatment is not acceptable to present practices of swine husbandry. Soil must be periodically replaced, dosage control is not practical, and iron content of the soil is usually unknown and the method may constitute a hazard in the spread of internal parasites and infectious diseases.

The feeding of considerable amounts of iron (or iron and copper) to the sow before or after farrowing does not prevent or delay the development of anemia in the piglet. Such treatment does not increase the iron content of the sow's milk nor does it increase significantly the total iron content of the newborn pig's body or the amount of iron stored in the liver.

Previous methods of maintaining the pregnant sow on pasture until farrowing does not prevent or delay the occurrence of piglet anemia during the confinement practiced in modern swine husbandry. The method does not increase iron storage in the body or the amount of iron stored in the liver of the fetus, and does not increase the iron content of milk after farrowing.

As will be seen from the foregoing, previous methods employed to prevent the development of iron deficiency anemia in suckling pigs have not been entirely satisfactory. We have discovered, however, a new method of preventing iron deficiency anemia in baby pigs during the period of time from their birth until they are able to eat foods containing adequate amounts of iron, which method is convenient, inexpensive, safe and effective, and does not require close confinement or restraint of the dam or the service of a veterinarian.

Our invention is based upon our discovery that the pregnant sow can be fed a normal diet which contains an adequate amount of iron whereby the deposition of iron in the body of the fetus is increased so that there is enough iron in the baby piglet at birth to allow it to survive the first 3 or 4 weeks of life without developing iron deficiency anemia. This is accomplished in accordance with the present invention by adding to the diet of the pregnant sow, particularly during the last 2 weeks of pregnancy, fatty acid esters of polyoxyethylene sorbitans such as, for example, polyoxyethylene sorbitan monostearate, polyoxyethylene sorbitan tristearate, polyoxyethylene sorbitan monolaurate, polyoxyethylene sorbitan monoleate, polyoxyethylene sorbitan monopalmitate, polyoxyethylene sorbitan trioleate, and other polyoxyethylene derivatives of the fatty acid esters of sorbitol anhydrides. These products are commercially available under the tradename Tween. They are non-ionic surface active agents and are principally used as emulsifying agents.

To illustrate the invention in particularity, reference is made to experiments in which the invention was demonstrated. Seven gilts weighing approximately 400 pounds were separated into individual pens two weeks prior to farrowing. Each gilt was handfed six pounds of the following ration each day:

| | Pounds |
|---|---|
| Ground yellow corn | 660 |
| Wheat bran | 250 |
| Ground oats | 400 |
| Soybean oilmeal | 170 |
| Fish meal | 60 |
| Meat meal | 100 |
| Alfalfa meal | 100 |
| Molasses | 200 |
| Dried whey | 25 |
| Salt | 10 |
| Feed builder | 25 |
| Total | 2000 |

To this was added a premix consisting essentially of 20% by weight of a polyoxyethylene sorbitan monostearate and the remainder being corn meal to provide dosage levels of the polyoxyethylene sorbitan derivative of 0.66% and 1.54% as shown in the following table. After farrowing, the piglets were maintained on a concrete floor during the remainder of the experiment. They were weighed at approximately 3 days of age and a blood sample was taken from the ear vein for hemoglobin (Hb) and packed cell volume (PCV) determination. Similar information was recorded at weekly intervals for four weeks.

Hemoglobin content of the blood was determined by direct photometric procedure in which 0.025 cc. of blood was diluted with 5 cc. of 0.1 percent sodium carbonate, and percent transmission was read on a Rouy photometer at 550 m$\mu$. Grams percent of hemoglobin was determined with the International Micro-Capillary centrifuge.

During the pre-farrowing period, the gilts received the following treatments:

| Gilt | Treatment | Days Treated | Feed (lbs.) | Drug (gm.) | Gms. Surfactant per kgm. Weight of Gilt |
|---|---|---|---|---|---|
| 91BC | Polyoxyethylene sorbitan monostearate Tween 60 (0.66%). | 18 | 108 | 324 | 1.73 |
| 72BC | Polyoxyethylene sorbitan monostearate Tween 61 (0.66%). | 19 | 114 | 342 | 1.88 |
| 27BC | Polyoxyethylene sorbitan tristearate Tween 65 (1.54%). | 19 | 114 | 798 | 4.38 |
| 14BC | Polyoxyethylene sorbitan tristearate Tween 65 (0.66%). | 20 | 120 | 360 | 1.98 |

The results of this series of experiments are shown in the following table:

As will be apparent from the above results, the baby pigs maintained a satisfactory blood picture and weight gain over the 4-week period whereas the control pigs showed a tendency to become anemic and their rate of growth was not satisfactory. In each case, the mean daily weight gain of the baby pigs farrowed from mothers who had been fed one of the polyoxyethylene sorbitan fatty acid ester derivatives was substantially higher than the average of those baby pigs farrowed from a mother who received the basal diet without supplimentation with the surfactant.

The amount of fatty acid ester of polyoxyethylene sorbitan in the pregnant sow's diet to obtain adequate response may vary from about 10 mgs. per kilogram of body weight up to the point at which the animal refuses to eat the medicated diet. Fortunately, these products are relatively non-toxic and large amounts are not harmful. Preferably, the diet will contain as much of the sorbitol derivative as will provide 70 mgs. per kilogram of body weight. It is preferred that the sorbitol derivative be incorporated in the animal's feed as this tends to disguise the bitter taste of these products. It may, however, be incorporated in the drinking water if desired.

Inasmuch as it is not practical to distribute and sell the whole of the animal's diet, the polyoxyethylene sorbitol derivative will usually be included in a pre-mix which can conveniently be mixed with the remainder of the animal's diet by the farmer. These pre-mixes may consist of any suitable, edible material containing any desired amount of the sorbitol product up to, for example, 90% by weight.

The medicated feed supplement should be fed to the pregnant sows in ample time to allow the storage of adequate amounts of iron in the fetus. Accordingly, feeding with the supplemented diet should commence at least 7 days before farrowing and preferably earlier in the pregnancy.

Although most normal diets of the hog contain adequate amounts of iron, it may be desirable in some instances to add a non-toxic iron salt such as, for example, ferrous sulfate or other ferrous derivatives to the animal's feed to insure adequate amounts of iron in the pregnant sow's diet. Such supplemented diets may contain up to 0.05% by weight of ferrous iron.

Although the present invention has been described with particular reference to the prevention of iron deficiency anemia in suckling pigs, it will be understood that the presence of anemia caused by an iron deficiency can be prevented in other species by similarly incorporating in the diet of the the pregnant mother the same amounts of the fatty acid esters of polyoxyethylene sorbitols as described hereinabove.

We claim:
1. A method of preventing the development of iron deficiency anemia in suckling pigs which comprises administering to the pregnant sow at least 10 mgs. per kilogram of body weight per day of a fatty acid ester of polyoxyethylene sorbitans for a period of time of at least 7 days before farrowing.

2. A method of preventing the development of iron deficiency anemia in suckling pigs which comprises including in the diet of the sow during pregnancy from 0.2% by weight to 2.0% by weight of a fatty acid ester of polyoxyethylene sorbitan.

| Gilt Treatment | No. Pigs | Initial | | | 1 Week | | | 3 Week | | | 4 Week | | | Total Gain | Mean Daily Gain |
|---|---|---|---|---|---|---|---|---|---|---|---|---|---|---|---|
| | | Wt. | PCV | Hb | Wt. | PCV | Hb | Wt. | PCV | Hb | Wt. | PCV | Hb | | |
| Tween 60 (0.66%) | 5 | 3.4 | 28.9 | 9.6 | 7.1 | 25.4 | 7.6 | 13.4 | 26.4 | 7.4 | 16.7 | 30.2 | 7.8 | 13.3 | 0.48 |
| Tween 61 (1.54%) | 3 | 3.8 | 25.8 | 7.8 | 7.0 | 24.2 | 6.9 | 12.5 | 21.5 | 6.7 | 14.2 | 26.0 | 7.2 | 10.3 | 0.37 |
| Tween 61 (0.66%) | 6 | 3.8 | 30.0 | 9.9 | 7.8 | 28.3 | 7.9 | 15.0 | 25.1 | 7.0 | 19.3 | 25.9 | 7.4 | 15.5 | 0.55 |
| Tween 65 (1.54%) | 3 | 3.0 | 33.8 | 11.0 | 5.0 | 26.3 | 8.0 | 10.3 | 34.2 | 9.3 | 12.8 | 27.5 | 7.4 | 9.8 | 0.35 |
| Tween 65 (0.66%) | 3 | 33.2 | 5.3 | 10.5 | 5.3 | 27.3 | 9.4 | 11.3 | 24.8 | 7.6 | 14.3 | 23.2 | 6.0 | 11.0 | 0.39 |
| Control | 9 | | | | 6.4 | 19.2 | 6.0 | 10.0 | 22.6 | 6.4 | 12.2 | 21.2 | 5.7 | 5.8 | 0.28 |

3. A method of preventing the development of iron deficiency anemia in suckling pigs which comprises administering to the pregnant sow at least 10 mgs. per kilogram of body weight per day of polyoxyethylene sorbitan monostearate for a period of time of at least 7 days before farrowing.

4. A method of preventing the development of iron deficiency anemia in suckling pigs which comprises administering to the pregnant sow at least 10 mgs. per kilogram of body weight per day of polyoxyethylene sorbitan tristearate for a period of time of at least 7 days before farrowing.

5. A method of preventing the development of iron deficiency anemia in suckling pigs which comprises administering to the pregnant sow at least 10 mgs. per kilogram of body weight per day of polyoxyethylene sorbitan monolaurate for a period of time of at least 7 days before farrowing.

References Cited in the file of this patent
UNITED STATES PATENTS 2,851,394  Vaughan _____ Sept. 9, 1958

OTHER REFERENCES

Wissler: Proc. Soc. Exptl. Bid. Med., vol. 86, 1954, pages 170–176.

Mori: Chem. Abst., vol. 52, 1958, page 13996a.